F. BILLINGS AND R. P. GREENLEAF.
LOADING MACHINE.
APPLICATION FILED MAR. 18, 1918.

1,322,478.

Patented Nov. 18, 1919.
5 SHEETS—SHEET 1.

Inventors.
Frank Billings and
Robert P. Greenleaf
By
Thurston & Kwis

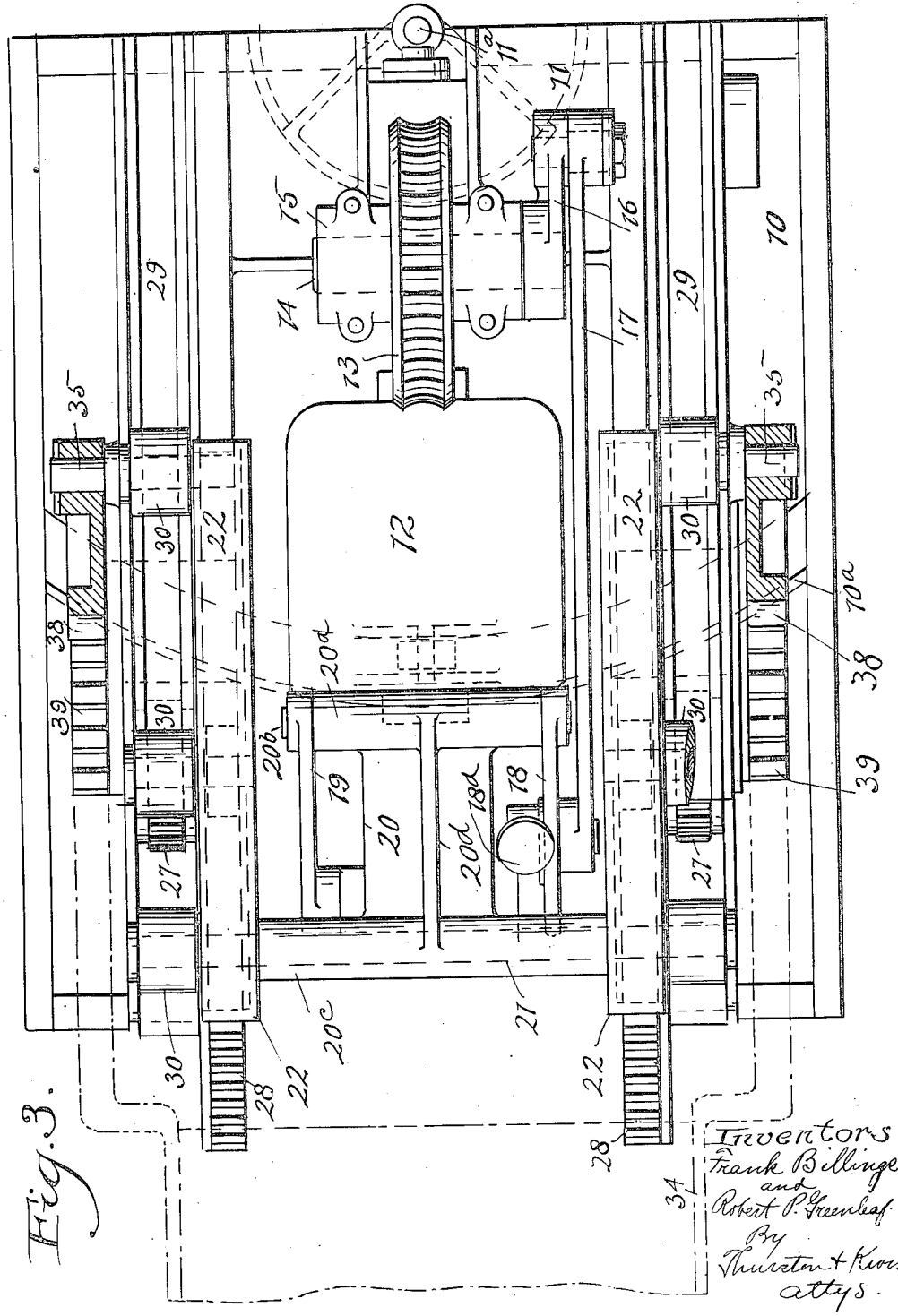

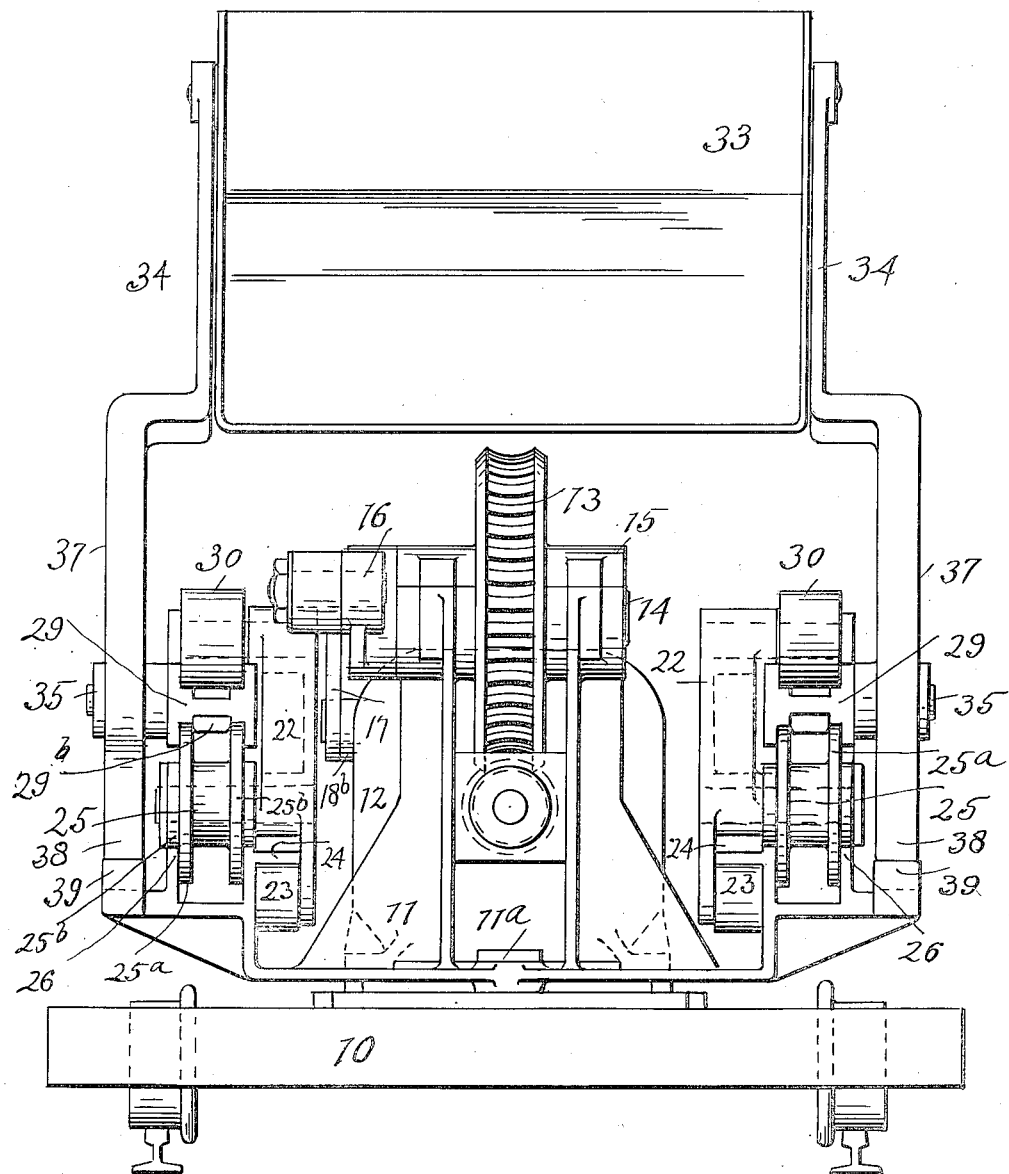

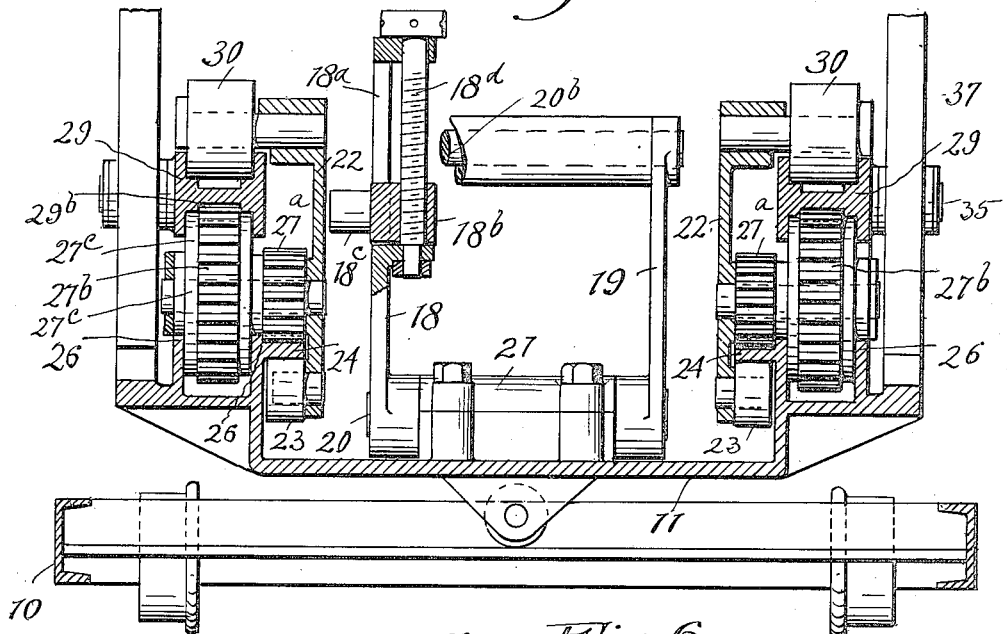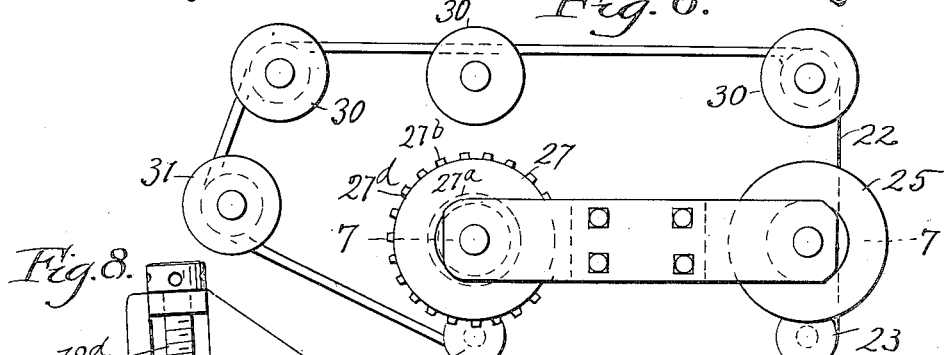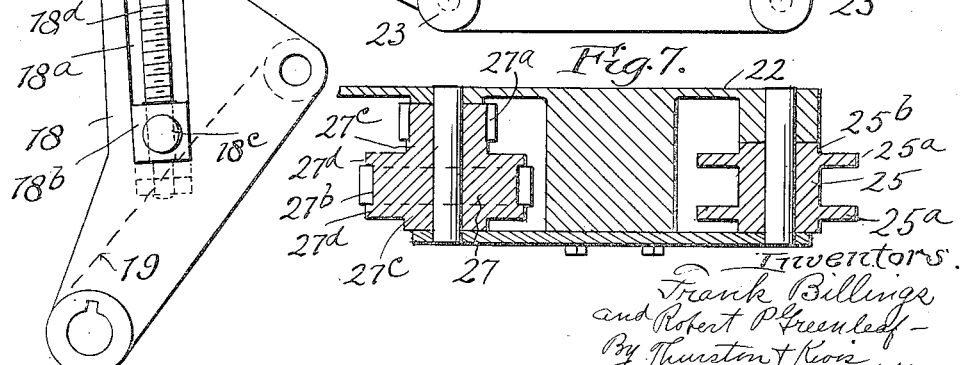

UNITED STATES PATENT OFFICE.

FRANK BILLINGS AND ROBERT P. GREENLEAF, OF CLEVELAND, OHIO; SAID GREENLEAF ASSIGNOR TO SAID BILLINGS.

LOADING-MACHINE.

1,322,478.   Specification of Letters Patent.   Patented Nov. 18, 1919.

Application filed March 18, 1918. Serial No. 223,010.

*To all whom it may concern:*

Be it known that we, FRANK BILLINGS and ROBERT P. GREENLEAF, citizens of the United States, and residents, respectively, of Cleveland, in the county of Cuyahoga and State of Ohio, and Cleveland, in the county of Cuyahoga and State of Ohio, have invented a certain new and useful Improvement in Loading-Machines, of which the following is a full, clear, and exact description.

This invention relates to a loading machine, and particularly of the general type disclosed in our prior application, Serial No. 179,200, filed July 9, 1917, and our Patent No. 1,286,168, November 26, 1918, wherein we have disclosed loading machines with a digging and conveying member in the form of shovel or bucket, which is designed to be thrust forward to be filled with material, and then to be retracted and swung upwardly and rearwardly over the machine so as to dump the material at the rear thereof. Some features of our invention may, however, be used with other types of loading machines, and are not confined to a machine having a digging and conveying member in the form of a bucket or shovel.

One of the objects of the invention is to provide a loading machine with an actuating member for the working tool, which member is composed of reciprocating telescopic or relatively movable parts, one of which has a relatively short stroke, while the other, though receiving movement from the first, has a relatively fast and a relatively long stroke.

A further object is to shorten the overall length of the machine without reducing the length of the stroke of the operating tool or material moving member.

A still further object is to provide a practical loading machine having a reciprocating ram for the digging or material moving member, which may be effectively operated, *i. e.*, thrust forwardly and retracted, and swung over the machine with a continuously operating motor.

The above and other objects are accomplished by our invention, which may be briefly summarized as consisting in certain novel details of construction and combinations and arrangements of parts which will be described in the specification and set forth in the appended claims.

Figure 1:
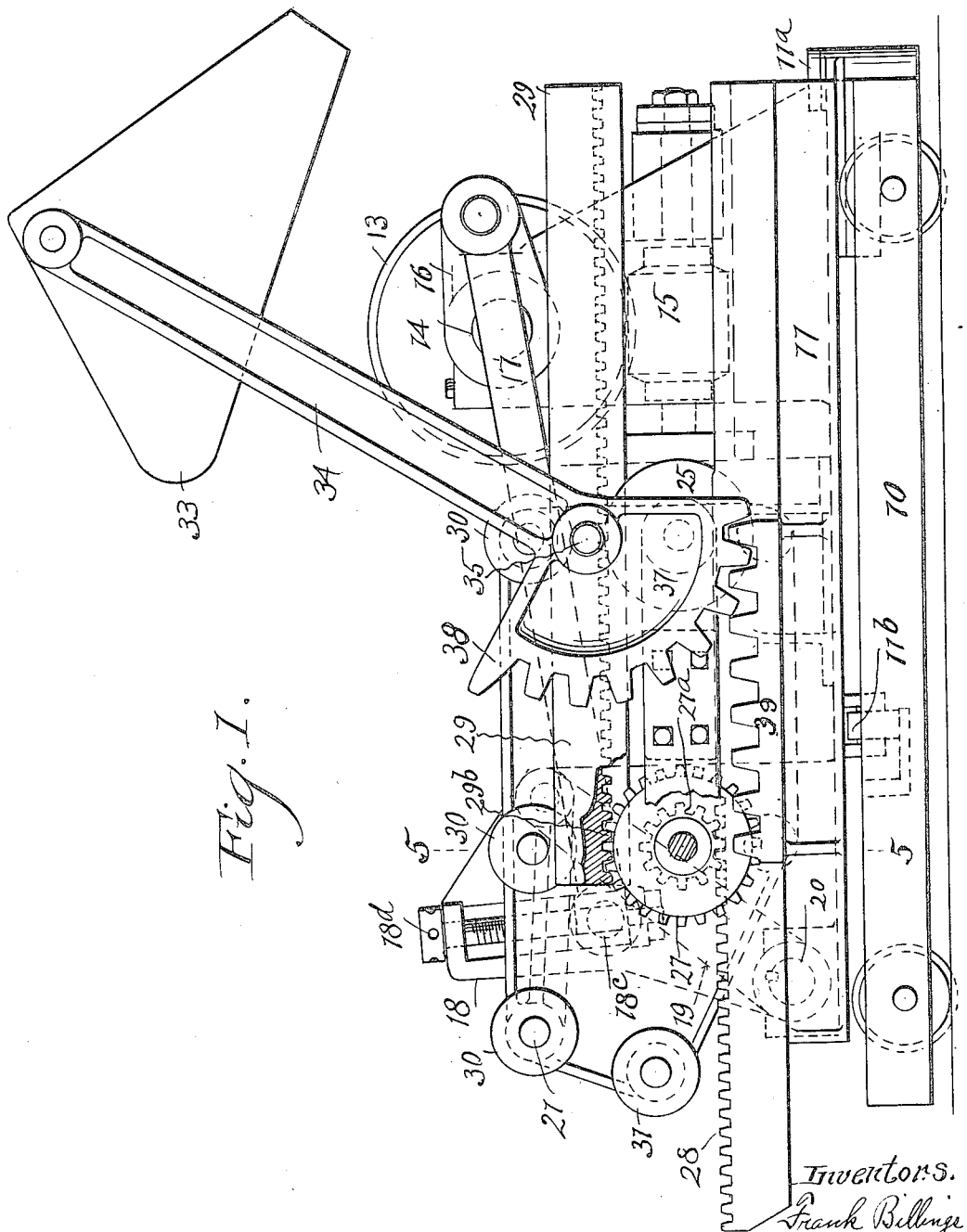
Figure 2:
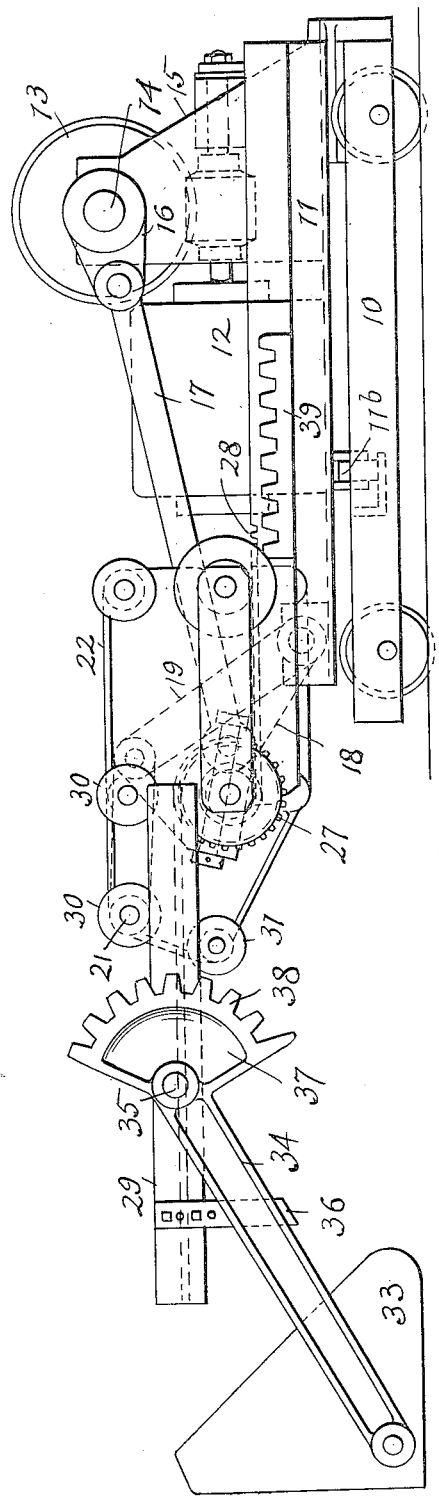

In the accompanying sheet of drawings, Figure 1 is a side view of a machine showing one embodiment of our invention, wherein the working tool or material moving member is in the form of shovel or hoe, the shovel being in substantially its dumping position, as shown in this figure; Fig. 2 is a similar view on a reduced scale with the machine extended and the shovel near the end of its outward movement or filling stroke; Fig. 3 is a top plan view of the structure shown in Fig. 1 with the shovel and shovel supporting arms omitted; Fig. 4 is an end view looking toward the rear of the machine, as shown in Fig. 1; Fig. 5 is a transverse sectional view substantially along the line 5—5 of Fig. 1; Fig. 6 is a detail side view of one of the ram members; Fig. 7 is a sectional view of the same substantially along the line 7—7 of Fig. 6; and Fig. 8 is a detail view of one of the swinging pivoted arms to which the motor operated connecting rod is designed to be connected.

Referring now to the drawings, 10 represents a truck frame or wheeled base carrying a laterally movable turn table 11 pivoted at its rear end to the rear part of the truck frame, as shown at 11ª, and having its forward portion supported by a roller 11ᵇ engaging in an arc-shaped track 10ª on the truck frame. The rear part of the turntable is supported adjacent the pivotal connecting pin 11ª through the medium of sliding segments equivalent to what is generally known as the fifth wheel of vehicle construction. Any other suitable way of mounting the turntable on the truck frame may, however, be utilized. The turntable has certain peculiar ram supporting and actuating flanges which will be referred to presently.

Supported at about the center of the turntable there is a motor 12, which is preferably a rotary motor, and may be electrically driven or driven by any suitable means or motive power. This motor has a rearwardly extending shaft which is connected by worm gearing, designated by the reference character 13, to a short shaft 14 mounted in bearings 15 near the rear end of the machine, and provided at one end with a crank 16 adapted to be continuously rotated by the motor 12 when the machine is in operation. This crank, through a forwardly extending connecting rod 17, transmits motion to a pair of swinging arms 18 and 19, mounted to swing on a short shaft 20 (see particularly Fig. 5) supported in bearings 21 near the front part of the turntable.

The arm 18 to which the connecting rod 17 is attached, is somewhat wider than the arm 19, as will be seen particularly by reference to Fig. 8, the arm 19 being shown in the figure by dotted lines. The arm 18 is made wider than the arm 19 in order that it may carry means for adjusting the point of connection between the connecting rod and the arm, this being accomplished by providing in the arm 18 a slot $18^a$ which receives a sliding block $18^b$ having an outstanding pin $18^c$ to which the forward end of the connecting rod is attached, which block is adjustable along the slot through the medium of a screw $18^d$ supported in bearings on the arm and adapted to be turned by any suitable tool. By adjusting the block along the slot the length of the forward stroke of the bucket can be varied without varying the discharge point of the bucket when the latter is swung over the machine, i. e., without varying the limit of rearward swinging movement over the machine.

Extending between and connected to the arms 18 and 19 is a link 20 which, as will be observed by reference to Fig. 3, is substantially H-shaped, this link having a rear bearing sleeve $20^a$ which fits in between and spaces apart the arms 18 and 19, and is connected thereto by a pin $20^b$, and having a relatively long forward bearing sleeve $20^c$ which is connected to the rear bearing sleeve $20^a$ by a relatively narrow ribbed web $20^d$. The forward end of this link, i. e., the relatively long bearing sleeve $20^c$, is connected by a transverse pin or shaft 21 to what may be termed the inner short stroke relatively slow moving part of a telescopic ram which is moved back and forth through the motor, connecting rod and link 20 and causes the bucket to pass continuously through its cycles of movement to be described presently.

This inner relatively short stroke part of the ram is composed of two similar simultaneously moving members in the form of castings 22 which are held together and constrained to move in unison through the pin 21, and forward bearing sleeve $20^c$ of the link 20. These castings travel along parallel guideways on opposite sides of the turntable 11 and are supported on the guideways by rollers, which in this case are carried by the ram members or castings 22. It will be observed, by reference to Figs. 5, 6, 7, that the ram members 22 carry lower rollers 23 which engage the under sides of two flanges 24 of the turntable, which flanges extend laterally inward; also that each ram member 22 carries just above the rear roller 23 a roller 25 having shrouds $25^a$ and shrouds $25^b$, the latter engaging the upper surfaces of upstanding flanges 26; also that each ram member 22 carries just forwardly of the rear roller 25 and above the forward lower roller 23 a combined gear and roller member 27, which is composed of a gear $27^a$, meshing with a stationary rack 28 preferably formed on the upper surface of the horizontal flange 24, also a gear $27^b$ which is larger than the gear $27^a$ and two shrouds $27^c$ which are on opposite sides of gear $27^b$ and roll or run on the same upstanding flanges 26 which are engaged by the shrouds $25^b$ of the rear roller 25, and in addition two shrouds $27^d$ which are in line with and the same diameter as the shrouds $25^a$ of the roller 25.

Thus it will be seen that when the arms 18 and 19 are swung back and forth by the motor and connecting rod it reciprocates back and forth the ram members 22 which roll smoothly on the flanges through the medium of the lower rollers 23 and upper roller members 25 and 27. It will be seen also that as these ram members 22 are reciprocated due to the engagement of the gears $27^a$ with the stationary racks 28, these gears $27^a$ and the larger gears $27^b$ which must travel with the gears $27^a$ are rotated.

The movement of the inner ram members 22 and the rotation of the gears $27^a$ and $27^b$ cause the much faster moving outer ram members 29 to be reciprocated with a telescopic action with reference to the inner members 22, these outer ram members 29 being supported by the inner ram members and not only moving faster but having a relatively long stroke as compared with the members 22. It will be observed by reference particularly to Fig. 5 that the outer ram members 29 are substantially H-shaped in cross section, and by reference to this figure and other views, it will be observed that each is supported on the corresponding inner ram member 22 through three upper rollers 30 arranged near the top of the ram member 22, and engaging the upper part of the ram member 29, and by the shrouds $25^a$ of roller member 25 and by the shrouds $27^d$ of the combined roller and gear member 27 and by a forward roller 31 forwardly of the member 27. This forms in effect three pairs of rollers by which each outer ram member 29 is supported for reciprocating movement relative to and on the corresponding inner ram member 22.

On the lower side of the horizontal web of each H-shaped outer ram member 29 is a rack $29^b$, which engages the relatively large gear $27^b$ of the combined gear and roller member 27 which is carried by the corresponding inner ram member 22, and is rotated by the engagement of the smaller gear 27ª with the stationary rack 28 of the turntable.

By reason of this construction the two inner ram members are simultaneously moved back and forth over the turntable with a length of stroke depending upon the position of the block 18ᵇ, which forms the connection between the connecting rod and the arm 18, and at the same time the two outer ram members 29 are reciprocated relative to the inner ram members moving back and forth simultaneously with the inner ram members, but moving faster and having a longer stroke than the latter, the rate of movement and the length of the stroke of the members 29 relative to the inner members 22 depending upon the relative sizes of the gears 27ª and 27ᵇ. In this case the gears 27ᵇ are twice the size of the gears 27ª, wherefore the outer ram members 29 will move three times as fast and will have three times the stroke of the inner member. It will be understood of course that relative to the turntable the outer ram members move three times as far as the inner ram members, but relative to the inner ram members the outer ram members move twice as far. It will be understood also that it is within the scope of our invention to have any ratio of pitch diameters of the gears 27ª, 27ᵇ which may be greater or less than 1 to 2.

By means of this construction, together with the provision of the three pairs of rollers for the outer ram member on the inner ram member which permit the wear ends of the outer ram members to advance forwardly beyond the rear pair of rollers during the extreme forward movement, and which permit the forward ends of the outer ram members to pass rearwardly beyond the forward pair of rollers during the last part of the inward movement, the whole machine can be shortened and we are enabled to avoid the use of parts which project forwardly a considerable distance beyond the truck frame, and therefore enabled to have bucket supporting arms of practically minimum length, all of which permits the machine to be operated with minimum head room. This of course is of particular importance with the type of machine herein disclosed utilizing a shovel with the swinging arms which carry the shovel bodily over the machine.

The outer ram members 29 carry a working tool or material moving member which in this case is in the form of a shovel or bucket 33, which is so supported on the ram and actuated that when the ram is moved outwardly the bucket is in digging or loading position, and receives its load and when the ram is retracted the shovel is first shifted back with the ram and then is swung upwardly and rearwardly over the machine to discharge the contents at the rear thereof into a suitable mine car or other receiving element, and then immediately following this the bucket is swung downwardly and forwardly in front of the machine to loading position, and is then again moved forwardly.

To accomplish this result the shovel has attached to it two arms 34 which are pivotally connected by pins 35 to the outer ram members 29, so that the shovel can be swung from its lowered position shown in Fig. 2 to its dumping position shown in Fig. 1, and back again to its lowered position. When the shovel is in the position shown in Fig. 2, that is, in digging or loading position, it is held rigid against backward swinging movement with respect to the ram by suitable stop members 36 which the arms 34 engage and against which they firmly bear due to the resistance of the material being loaded, these stop members being preferably adjustable to vary the normal position of the shovel. To rotate the arms over the machine we provide the inner ends of the arms with segments 37 having gear teeth 38 which are concentric with respect to the pivotal axis of the arms, and we provide on the turntable in the planes of these segments, two racks 39 which are so positioned that when the ram is retracted until the shovel is near the front of the machine, and with the ram somewhat near the end of its stroke, the gear segments engage the racks 39 so that during the remainder of the stroke of the ram the arms and the shovel are given a combined rotary movement over the machine and a movement of translation, and the combination of these two movements causes the shovel to be brought to the dumping position shown in Fig. 1. On the forward stroke of the ram the engagement of the gear segments with the racks carries the shovel forwardly and swings it downwardly in front of the machine until the arms engage the stops 36, whereupon the continued forward movement of the ram gives the filling stroke previously described.

From the above it will be obvious that a long stroke machine is provided without requiring considerable overall length when the ram is fully retracted, and without requiring long shovel supporting arms in order that the shovel may clear the forwardly projecting parts of the machine while the swinging movement is taking place. It will be apparent also that movements are continuous in the sense that the shovel goes through one cycle of movement after another without stopping or reversing the motor, and that we obtain from a continuously rotating motor not only the continuous operation, but, due to the fact that the movements are transmitted from the rotary motor to the shovel through the medium of the supporting and actuating telescopic ram which reciprocates in a straight line forwardly and rearwardly the digging mechanism has a direct thrust on the material, which is advantageous in securing maximum loading power with a machine of minimum weight and size.

The adjustability of the length of the forward stroke without affecting or altering the dumping or discharge point of the shovel is of considerable importance, especially when it becomes necessary to turn the turntable on the truck frame to reach material at the sides as well as in front of the machine. It will be understood that the turntable may be turned by hand or by any suitable means or tool, such as a crowbar.

It will be apparent that changes may be made in details of construction and arrangement, and in the types or forms of some of the parts, and we aim in our claims to cover all modifications which do not involve a departure from the spirit and scope of our invention in its broadest aspects.

Having described our invention, we claim:

1. In a loading machine, a frame or truck, a shovel adapted to be moved forwardly and rearwardly and to be swung over the machine to dumping position, and means for actuating the same, comprising a motor, and a reciprocating ram composed of relatively movable parts one connected to the motor, and the second to the shovel, said second part being actuated by the first and having a movement relative to the first which is greater than the movement of the first relative to the frame or base.

2. In a loading machine, a truck or frame, a shovel adapted to be moved forwardly and rearwardly and to be swung over the machine to dumping position, means for actuating said shovel comprising a motor, a telescopic reciprocating ram between the motor and shovel and comprising a part connected to the motor, and a second part connected to the first part and to the shovel, said second part having a longer stroke than the first and moving faster relative to the first than the latter moves relative to the truck or frame.

3. In a loading machine, a truck or frame, a shovel adapted to be moved forwardly and rearwardly and to be swung over the machine to dumping position, means for actuating said shovel comprising a motor and a reciprocating ram between the motor and shovel, said ram having one part which is connected to the motor, and a second part which is connected to the shovel, and multiplying gearing between the parts by which the first actuates the second so that the second moves relative to the first a greater distance than the first moves relative to the frame.

4. In a loading machine, a frame or truck, a shovel adapted to be moved forwardly and rearwardly and to be swung over the machine to dumping position, mechanism for actuating the shovel comprising motive means, and a telescopic reciprocating ram between the motive means and shovel, and comprising a part which is connected to and operated by the motive means, and a second part which is connected to the shovel and is actuated by the movement of the first, and mechanism for causing the second part to be actuated relative to the first part at higher speed and with longer stroke than the first, said mechanism comprising a stationary rack, a movable rack on the second part, gears of two sizes carried by the first part, the smaller gear engaging the stationary rack and the larger gear engaging the rack on the second part of the ram.

5. In a loading machine, a truck or frame, a shovel, mechanism for actuating the shovel so as to give it a forward filling stroke and a swinging movement over the machine to dumping position, said mechanism comprising a forwardly and rearwardly movable ram connected to the shovel, a motor driven fixed stroke member for actuating the ram, and mechanism between said member and the ram by which the forward limit of movement of the shovel may be varied.

6. In a loading machine, a truck or frame, a material moving member in the form of a shovel, mechanism for giving said shovel a forward and rearward movement, and a swinging movement over the machine to dumping position, said mechanism comprising a ram, a continuously moving motor operated fixed stroke member connected to the ram to actuate the same, and means whereby the forward stroke of the ram may be varied without substantially varying the point of discharge of material from the shovel.

7. In a loading machine, a frame or base, a material moving member in the form of a shovel, mechanism for actuating the shovel so as to give it a forward and rearward movement and a swinging movement over the machine so as to discharge material therefrom, said mechanism comprising a forwardly and rearwardly movable telescopic ram, motive means connected to one part of the ram so as to continuously move the same forwardly and rearwardly, an arm connecting the shovel to a second part of the ram, and means for causing the arm and shovel to turn relative to said second part of the ram.

8. In a loading machine, a frame or base, a shovel, means for giving said shovel a forward and rearward movement and a swinging movement over the machine, comprising a forwardly and rearwardly moving ram to which the shovel is connected, a motor, a crank rotated by the motor, and connecting means between the crank and said ram and including relatively adjustable devices capable of being adjusted to vary the forward limit of movement of the shovel without substantially varying the dumping position of the shovel.

9. In a loading machine, a frame or base, a material moving member in the form of a shovel, means for actuating said shovel so as to give it a forward and rearward movement and a swinging movement over the machine to dumping position, comprising a forwardly and rearwardly reciprocating ram, a swinging arm for actuating said ram, a motor, and a rotary crank driven by the motor and connected to said arm, the connecting means between the arm and ram including relatively adjustable parts which permit the forward limit of movement of the shovel to be varied.

10. In a loading machine, a frame or base, a material moving member in the form of a shovel, means for actuating said shovel so as to give it a forward and rearward movement and a swinging movement over the machine, comprising a forwardly and rearwardly reciprocating ram, a swinging arm for actuating said ram, a motor, means driven by the motor and connected to said arm to operate the same, and means for varying the stroke imparted by said arm without affecting the discharge point of the shovel.

11. In a loading machine, a frame or base, a shovel, means for actuating said shovel so as to move the same forwardly and rearwardly and to give the same a swinging movement over the machine to dumping position, said means comprising a forwardly and rearwardly movable telescopic ram including a part having a relatively short stroke relative to the frame and a second part having a long stroke relative to the first part, said second part being actuated by the first part and being connected to the shovel, and means connected to the first part to actuate the same.

12. In a loading machine, a frame or base, a shovel, means for actuating said shovel so as to move the same forwardly and rearwardly and to give the same a swinging movement over the machine to dumping position, said means comprising a forwardly and rearwardly movable telescoping ram, including a part motor actuated and a second part having a relatively long stroke relative to the stroke of the first part and actuated by the first part, connecting means between the shovel and said second part of the ram comprising an arm extending from the shovel and pivoted to said second part, and means whereby said arm and shovel are turned on said second part of the ram.

13. In a loading machine, a frame or base, a shovel, means for actuating the shovel so as to give it a forward and rearward movement and a swinging movement over the machine, said means comprising a telescopic reciprocating ram including two relatively short stroke members mounted on the frame or base and two members supported by the first members and actuated thereby, so as to have a movement relative to the first which is greater than the movement of the first relative to the frame or base, means for actuating the two short stroke members, and means connecting the shovel to the relatively long stroke members.

14. In a loading machine, a frame or base, a shovel, means for actuating the shovel so as to give it a forward and rearward movement and a swinging movement over the machine, said means comprising a telescopic reciprocating ram including a relatively short stroke member mounted on the frame or base and a member supported by the first member and actuated thereby, so as to have a movement relative to the first which is greater than the movement of the first relative to the frame or base, means for actuating the short stroke member, means connecting the shovel to the relatively long stroke member, said connecting means comprising an arm connected to the shovel and pivotally connected to said relatively long stroke member, and means whereby said arm may be turned about its pivotal axis.

15. In a loading machine, a frame or base, a shovel, means for actuating the shovel so as to give it a forward and rearward movement and a swinging movement over the machine, said means comprising a telescopic reciprocating ram including a short stroke member mounted on the frame or base and a relatively long stroke member supported by the first member and actuated thereby, means for actuating the short stroke member, means connecting the shovel to the relatively long stroke member, and means whereby the stroke of the short stroke member may be varied.

16. In a loading machine, a frame or base, a shovel, means for actuating the shovel so as to give it a forward and rearward movement and a swinging movement over the machine, said means comprising a telescopic reciprocating ram including a member movably mounted on the frame or base and a second member actuated by the first member, means connecting the shovel to the second member, and means for actuating the first member comprising a rotary motor, and mechanism connecting the same to the first member including a fixed stroke motor driven part and variable stroke connecting means between said part and the first member of the ram.

17. In a loading machine, a frame or base, a shovel, means for actuating the shovel so as to give it a forward and rearward movement and a swinging movement over the machine, said means comprising a telescopic reciprocating ram including a member movably mounted on the frame or base and a second member actuated by the first member, means connecting the shovel to the second member and means for actuating the first member comprising a rotary motor, a swinging arm connected to said first member, and driving mechanism between said motor and said arm.

In testimony whereof, we hereunto affix our signatures.

FRANK BILLINGS.
ROBERT P. GREENLEAF.